US006292484B1

(12) United States Patent
Oliver

(10) Patent No.: US 6,292,484 B1
(45) Date of Patent: Sep. 18, 2001

(54) SYSTEM AND METHOD FOR LOW OVERHEAD MULTIPLEXING OF REAL-TIME AND NON-REAL-TIME DATA

(75) Inventor: David C. Oliver, San Antonio, TX (US)

(73) Assignee: Data Race, Inc., San Antonio, TX (US)

( * ) Notice: Subject to any disclaimer, the term of this patent is extended or adjusted under 35 U.S.C. 154(b) by 0 days.

(21) Appl. No.: 09/100,778

(22) Filed: Jun. 10, 1998

Related U.S. Application Data

(60) Provisional application No. 60/049,182, filed on Jun. 11, 1997.

(51) Int. Cl.[7] .................................................. H04J 3/24

(52) U.S. Cl. ................................................................ 370/389

(58) Field of Search ........................................ 370/389, 401, 370/402, 351, 352, 403, 501, 502, 276, 464, 465, 282, 296, 503, 509, 510, 512, 517, 528, 525, 535, 537; 379/93.09, 93.23, 229, 220, 219; 714/758, 746, 754

(56) References Cited

U.S. PATENT DOCUMENTS

| | | |
|---|---|---|
| 5,574,725 | 11/1996 | Sharma et al. . |
| 5,764,639 | 6/1998 | Staples et al. . |
| 5,812,534 | 9/1998 | Davis et al. . |
| 5,859,979 | * 11/1999 | Tung et al. ............................ 370/260 |
| 6,125,398 | * 9/2000 | Mirashrafi et al. ................... 370/431 |

FOREIGN PATENT DOCUMENTS 0 582 537   2/1994   (EP) .

OTHER PUBLICATIONS

O'Neill et al., "An overview of Internet protocols," BT Technol. J., vol. 16, No. 1, Jan. 1998, pp. 126–139.
Lindbergh, "The H.324 Multimedia Communication Standard," IEEE Communications Magazine, Dec. 1996, pp. 46–51.
"In–band DCE control and synchronous data modes for asynchronous DTE," ITU–T Recommendation V.80, Aug. 1996, pp. 1–32.

* cited by examiner

*Primary Examiner*—Dang Ton
(74) *Attorney, Agent, or Firm*—Conley, Rose & Tayon, PC; Robert C. Kowert

(57) ABSTRACT

A system and method for low latency multiplexing of real-time and regular data in the same data frame. Real-time data capable of being delivered at regular intervals (such as digitized voice) is multiplexed with regular (non-real-time data) across a communications link (such as a modem connection). The link's existing packet protocol (such as V.42/HDLC) may be extended to provide low latency for the real-time data, with minimal impact on existing data-transfer efficiency. Before each data frame is transmitted, the transmitter determines the time before the next real-time data will become available for transmission. If the real-time data will become available before the data frame will have been completely transmitted, the real-time data may be embedded within the frame as follows. Bit values within the header of the data frame may be used to indicate the offset within the frame of the start of the real-time data. Regular data may be transmitted until this offset is reached, at which point a "capsule" of real-time data may be inserted into the data stream. The receiver may use the bit values to determine where to start interpreting the data stream as a capsule. After inserting the capsule, the transmitter may resume transmitting the regular data. Both transmitter and receiver determine when the next real-time data is expected by adding a predetermined amount to the offset of the previous capsule. When this offset is reached another capsule is transferred. This continues until the end of the frame is reached.

67 Claims, 10 Drawing Sheets

| | 1 | 2 | 3 | 4 | 5 | 6 | 7 | 8 | 9 | |
|---|---|---|---|---|---|---|---|---|---|---|
| Data transmitted | F | F | F | F | F | F | F | F | F | 150 |
| Data stream | 1111 | 10111 | 11011 | 11101 | 11110 | 1111 | 10111 | 11011 | 11101 | 152 |
| Leading/trailing | 1111 | 1111 | 1111 | 1111 | 1111 | 1111 | 1111 | 1111 | 1111 | 154 |
| Sums | 4/4 | 4/4 | 4/4 | 4/4 | 4/4 | 4/4 | 4/4 | 4/4 | 4/4 | 156 |
| Bits counted | 4 | 8/3 | 7/2 | 6/1 | 5/0 | 4 | 8/3 | 7/2 | 6/1 | 158 |
| | 4 | 4+1 | 4+1 | 4+1 | 4+1 | 4 | 4+1 | 4+1 | 4+1 | 160 |
| Total count | 4 | 9 | 14 | 19 | 24 | 28 | 33 | 38 | 43 | 162 |

*Fig. 10*

| | 1 | 2 | 3 | 4 | 5 | 6 | 7 | 8 | 9 | |
|---|---|---|---|---|---|---|---|---|---|---|
| Data transmitted | D | 7 | F | E | 7 | F | B | 0 | F | —170 |
| Data stream | 1011 | 11100 | 1111 | 0111 | 11010 | 1111 | 10101 | 0000 | 1111 | —172 |
| | 1011 | 1110 | 1111 | 0111 | 1110 | 1111 | 1101 | 0000 | 1111 | —174 |
| Leading/trailing | 1/2 | 3/0 | 4/4 | 0/3 | 3/0 | 4/4 | 2/1 | 0/0 | 4/4 | —176 |
| Sums | 1 | 5 | 4 | 4 | 6 | 4 | 6 | 1 | 4 | —178 |
| Bits counted | 4 | 4+1 | 4 | 4 | 4+1 | 4 | 4+1 | 4 | 4 | —170 |
| Total count | 4 | 9 | 13 | 17 | 22 | 26 | 31 | 35 | 39 | —172 |

*Fig. 11*

SYSTEM AND METHOD FOR LOW OVERHEAD MULTIPLEXING OF REAL-TIME AND NON-REAL-TIME DATA

PRIORITY INFORMATION

Benefit of priority is claimed under 35 U.S.C. 119(e) of U.S. provisional application No. 60/049,182 filed Jun. 11, 1997.

FIELD OF THE INVENTION

The present invention relates to the simultaneous transmission of real-time data (such as voice data) and non-real-time data, and more particularly to embedding real-time data within non-real-time data frames.

DESCRIPTION OF THE RELATED ART

Traditionally, separate communication links have been employed to transmit real-time data and non-real time data. For non-real-time data, a modem may have been connected to a telephone line used to transfer a data file from one computer, across the public switched telephone network (PSTN), to be received by another modem and downloaded into another computer. A regular telephone connection is an example of transferring real-time voice data from one user, across the PSTN, to another user. If a user desired to transfer both voice data and non-real-time data simultaneously, two telephone connections were required. For example, to speak in real time to the recipient of data file being transferred from one computer to another, one telephone connection was required for the real-time conversation (voice data) and another connection for transferring the data file (non-real-time data). Thus, individuals desiring the ability to simultaneously transmit real-time and non-real-time data were required to maintain at least two separate telephone connections. The requirement of two telephone connections added expense and complexity.

Recognizing the desirability of simultaneous transfer of voice and non-real-time data, several mechanism have been introduced to permit the transfer of voice and non-real-time data simultaneously on the same telephone connection. A common use of such systems is in the area of collaborative work, such as a whiteboard application which allows two users to annotate a shared document, for example, while simultaneously speaking to one another about the annotations on the same telephone line. Simultaneous or multiplexed voice and data transmission is also popular in gaming applications. A brief description of some of the existing solutions follows.

Digital storage and communication of voice or speech signals has become increasingly prevalent in modern society, in particular in telephony. Digital communication of speech signals comprises generating a digital representation of the speech signals and then transmitting those digital representations to a receiver upon a communications path. The receiver receives the digital representation of the speech and converts the digital representation of the speech signals back into the original speech, or at least an approximation of the original speech.

Once the voice encoded speech has been generated it may be transmitted to a receiver. The receiver receives the voice encoded speech and decodes it to produce an approximation of the original speech. Devices which perform voice encoding and decoding are commonly referred to as voice encoder/decoders, or vocoders. Because the amount of digital information which represents the voice encoded speech is typically much less than that required for the original speech, the voice encoded speech is also commonly referred to as compressed speech.

One recent application of using compressed speech in digital communications is in Digital Simultaneous Voice and Data (DSVD) modems. DSVD modems employ techniques for multiplexing compressed speech with digital data for transmission over a normal telephone line. A first DSVD modem compresses, or encodes, a transmitting subscriber's speech, statistically multiplexes it in frames between data frames from the transmitting subscriber's digital device such as a computer, and transmits the separate speech and data frames upon a telephone line to a second DSVD modem. The second DSVD modem receives the multiplexed speech and data frames, separates the speech frames from the data frames, and decompresses, or decodes, the compressed speech back into the original analog speech signal so that it can be provided to the receiving subscriber. The same process occurs in the opposite direction, thus enabling the two subscribers at each end of the telephone line to speak to one another, while simultaneously transferring data over the same line.

DSVD modems transmit data in data frames. A data frame marks the beginning and end of a segment of data and may contain additional information about the data format, etc., in a header. Voice data is transmitted in separate data frames from regular data. The separate frames are multiplexed so that the bandwidth is statistically divided between voice frames and regular data frames. For example, a 28.8 Kbps modem may simultaneously transmit regular data at 19.2 Kbps and voice at 9.6 Kbps. However, DSVD modems have several disadvantages. By inserting a substantial amount of regular data between each real-time (e.g. voice) frame, the latency between real-time transfers is increased. This latency may result in the real-time data appearing or sounding "jerky". The size of the data frames my be reduced to decrease this latency, but that results in increased overhead due to the overall increase in the number of frames. Therefore, decreasing frame size to improve latency, decreases the overall data throughput. Several ad hoc DSVD implementations exist from communication vendors and DSVD is addressed in the International Telecommunication Union (ITU) V.70 standard. However, all of these implementation suffer from the above noted disadvantages.

Another technique for simultaneous voice and non-real-time data transmission is integrated services digital network (ISDN). ISDN provides a digital interface to the public switched phone network. Increased transmission rates are provided due to the digital interface. Latency and overall throughput is improved with ISDN. An ISDN connection provides low level time-division multiplexing of voice and regular data, using hardware to allocate a fixed part of the data bandwidth between voice and regular data. This adds complexity and special hardware to the system. A special ISDN service must be subscribed to from the phone company and may not be available in all areas. An ISDN service is typically more expensive. Furthermore, if the amount of real-time data varies dynamically, extra overhead is imposed on the regular data even when the full real-time data allocation is not needed.

Another technique to implement simultaneous real-time and non-real-time data transmission is to interrupt regular data frames in a modem connection by non-standard "abort" tokens in order to introduce real-time data. Using the suspend/resume tokens of the ITU V.76 recommendation is such an approach. However, using "abort" tokens has the disadvantage of requiring special hardware to create and detect the abort tokens. Furthermore, overhead is increased by the use of the tokens and additional frame information.

As described above, all the existing solutions to provide simultaneous real-time and non-real-time data communication suffer because they either require special hardware (and have increased complexity and/or expense) or negatively impact latency and overhead, or both. It is therefore desirable to provide a low latency technique to communicate real-time and non-real-time data over a conventional modem connection with minimal impact on performance.

SUMMARY OF THE INVENTION

The problems outlined above are in large part solved by an improved communications mechanism. The communications mechanism may be implemented through a modem which includes a controller and a data pump for transmitting and receiving data across a communication link. The communication link may include the public switched telephone network (PSTN). The modem may receive regular, or non-real-time, data from a device such as a computer, and may receive real-time data from a real-time data device such as a telephone. The transmitter portion of the data pump may be configured to transmit data across the communication link in data frames. The controller may be configured to provide real-time data and non-real-time data in the same data frame to the transmitter. The controller may be further configured to encapsulate the real-time data into a plurality of real-time capsules at regular intervals. The controller may receive the real-time data from the real-time data device at corresponding regular intervals. The controller may be configured to insert the real-time capsules into data frames at a count approximately equal to the regular interval and insert non-real-time data between the real-time capsules in the data frames. The count is determined according to a data transmission rate and by counting units of data to be transmitted. The units of data counted may be octets. Each real-time data capsule may include its own length indication and/or an error code such as a cyclic redundancy check (CRC) code.

Each data frame may comprise boundary portions including a header portion. The controller may be further configured to indicate within the header portion an offset within the data frame at which a first real-time capsule will be transmitted in the data frame. The controller may then insert the first real-time capsule at the offset and insert subsequent real-time capsules after the first real-time capsule at the count from the beginning of the immediately previous real-time capsule, such that real-time capsules are offset from each other by the count corresponding the regular interval. Non-real-time data may be transmitted between the capsules. If the count indicates that an insertion point for a real-time capsule falls at one of the frame boundary portions, the controller may delay insertion of that real-time capsule as a first real-time capsule until immediately after the header portion. The controller may then insert the next real-time capsule following the first real-time capsule at the count from the beginning of the first real-time capsule minus the amount by which the first real-time capsule was delayed. The controller may indicate in the header portion that the next real-time capsule following the first real-time capsule will be inserted at the count minus the amount by which the first real-time capsule was delayed.

The controller may also be configured to synchronize the count to the regular interval at which real-time data becomes available by adjusting the offset at the beginning of each frame. Also, "stuff bits" may be inserted into the data transmission across the communication link in order to distinguish special data sequences from regular data sequences. In this case the controller may be configured to adjust the counting of data units by incrementing the number of bits counted when a number of "stuff bits" corresponding to a data unit has been detected. Where the data unit being counted is an octet, the counting may be adjusted for "stuff bits" by determining the number of leading and trailing ones for each nibble of data. A sum may be obtained by adding the current nibble's number of leading ones to the previous nibble's number of trailing ones. If the sum is five or more, the bits counted are incremented. If the sum is five or more and the current nibble's number of leading ones is four, the number of ones in the previous nibble that correspond to the previous data sequence (five) are subtracted from this sum and the result is used as the previous nibble's number of trailing ones when calculating the sum for the next nibble. Incrementing means counting an additional bit beyond the 4 bits of the nibble to take account of a "stuff bit".

A modem may also include a receiver configured to receive data across a communication link and data frames, and a controller configured to interpret real-time data and non-real-time data in the same data frame. The controller may be configured to receive data frames that comprise a header and a data stream and determine if the header indicates that real-time data is embedded within the data stream. If real-time data is embedded in the data stream, the controller may interpret the data stream as having real-time data capsules spaced by a predetermined count and non-real-time data between the real-time data capsules until the end of the frame. The controller may also be configured to interpret the data stream as having a first real-time capsule located at an offset indicated within the header of the frame. Each real-time data capsule may include its own length indication and/or an error code such as a cyclic redundancy check (CRC) code. The controller may count units of data to determine when the predetermined count is reached in order to separate real-time capsules from regular data. If "stuff bits" are included, the receiving controller may account for "stuff bits" when counting data units as described above. The header may indicate a special offset in the data frame at which a second real-time data capsule following a first real-time data capsule is located. The special offset may indicate that the second real-time data capsule is offset from the first real-time capsule less than the predetermined account. This may be when the case when the transmitting device delayed the first real-time capsule. If the receiving controller determines that real-time data is not embedded in the data stream, the data frame is interpreted as containing non-real-time, or regular, data.

Broadly speaking, a method for transmitting real-time data across a communication link transferring non-real-time data is disclosed. The method includes preparing a non-real-time data frame for transmission. If real-time data will be available for transmission before the non-real-time data frame transmission will have been completed, real-time data may be embedded within the non-real-time data frame and the non-real-time data frame with embedded real-time data may be transmitted to a receiver. If real-time data will not be available fore transmission before the non-real-time data frame transmission will have been completed, the non-real-time data frame without embedded real-time data may be transmitted to the receiver. This method may further include determining if the real-time data will be available for transmission before the non-real-time data frame transmission will have been completed. Real-time data may become available at approximately regular intervals from a real-time data device. Real-time data may include voice or telephony data or may include mouse or sprite positing data or any other type of real-time data. Embedding real-time data within a non-real-time data frame and transmitting the non-real-time data frame with embedded real-time data to a receiver may further include indicating within a header of the non-real-time data frame and offset within the frame locating the start of the real-time data. Non-real-time data may be transmitted after the header until this offset is reached. A capsule of real-time data is then transmitted at the offset within the same frame. Transmitting a capsule of real-time data may include indicating the length of the real-time data capsule being transmitted. The length of the real-time data capsule being transmitted may be indicated in a header or initial octet of the real-time data capsule. This length may be set to zero if no real-time data need be transmitted at that capsule location. In the example of audio real-time data, this may be the case during audio silence, muting, or half duplex audio.

An error check code may also be included within the capsule of real-time data. The error check code may comprise cyclic redundancy check (CRC) bits inserted at the end of the capsule. Embedding the real-time data may also include transmitting another capsule of real-time data after a predetermined length from the beginning of the immediately preceding capsule of real-time data. Non-real-time data may be transmitted between capsules of real-time data within the same frame. This predetermined length between capsules may correspond to a regular interval at which the real-time data becomes available. Transmitting addition capsules of real-time data at the predetermined interval and transmitting non-real-time data between the capsule may be repeated until the end of a frame. The predetermined length may be measured by counting predetermined units of data, such as octets, from the beginning of the immediately preceding capsule of real-time data.

Generally, the present communication mechanism may include a method for transmitting real-time data and non-real-time data across a communication link in the same data frame. The real-time data may be available at a regular interval. The method includes encapsulating real-time data into a plurality of real-time capsules and inserting the real-time capsules into a data frame at a count approximately equal to the regular interval. The method also includes transmitting non-real-time data between the real-time capsules and the data frame. The count is determined according to a data transmission rate by counting units of data to be transmitted. A data frame may include boundary portions including a header portion. The method may further include indicating within the header portion an offset within the data frame of a first real-time capsule to be transmitted in the data frame. The first real-time capsule may be inserted at the offset. Additional real-time capsules may be inserted after the first real-time capsule at the predetermined count from the beginning of the immediately preceding real-time capsule.

If the count indicates that an insertion point of a real-time capsule falls at a frame boundary portion, the method may include delaying insertion of that real-time capsule as the first real-time capsule of a new frame until immediately after the header portion. The next real-time capsule following the first real-time capsule may then be inserted at the predetermined count from the first real-time capsule minus the amount by which insertion of the first real-time capsule was delayed. This may be indicated in the header portion of the frame by a special offset value which indicates that the real-time capsule following the first real-time capsule will be inserted at the count minus the delay from the beginning of the first real-time capsule. Generally, the method may also include synchronizing the count to the regular interval by adjusting the offset of the first real-time capsule in each data frame. This resynchronizing may done to compensate for clock drift between the real-time source and a modem.

"Stuff bits" may be inserted into the transmission across the communication link to distinguish special data sequences from regular data sequences. The method may adjust the count to compensate for the "stuff bits" by incrementing the number of bits counted when a number of "stuff bits" corresponding to the unit of data being counted has been detected. When the unit of data being counted is an octet, this adjusting may be accomplished by determining the number of leading and trailing ones for each nibble of data. A look-up table implemented by software may be used for this purpose. A sum is obtained by adding the current nibble's number of leading ones to the previous nibble's number of trailing ones. If this sum is five or more, an additional bit is counted. If the sum is five or more and the current nibble's number of leading ones is four, the number of ones in the previous nibble that correspond to the previous data sequence (five) are subtracted from the sum and the result is used (as the previous nibble's trailing ones) when calculating the sum for the next nibble. The current nibble is counted and the process continues.

A method for receiving real-time data and non-real-time data is also contemplated. The method may include receiving a data frame comprising a header and a data stream, and determining if the header indicates that real-time data is embedded within the data stream. If real-time data is embedded in the data stream, the method includes interpreting the data stream as having real-time data capsules spaced by a predetermined count and non-real-time data between the real-time data capsules until the end of the data frame. A header in the data frame may indicate an offset in which a first real-time data capsule is located within the data frame. Each capsule may include a length indication and an error code indication, such as CRC. Units of transmitted data may be counted to determine when the predetermined count is reached. Accounting for "stuff bits" may be performed as described above. The header may also indicate a special offset in the data frame at which a second real-time data capsule following a first real-time data capsule is located. This special offset may indicate that the second real-time data capsule is offset from the first real-time capsule less than the predetermined count. This may have been the case if the transmitting device delayed the first real-time data capsule due to a frame boundary and backed up the second real-time data capsule to regain synchronization. If the receiving method determines that real-time data is not embedded in the data stream, the data stream may be interpreted as having only non-real-time data.

The present invention also contemplates a computer readable storage medium comprising program instructions that may be operable to implement the aforedescribed methods and/or modem configurations. Such computer readable storage medium may include flash memory, ROM, EPROM, DRAM, magnetic storage such as hard drive or floppy disk, and/or CD-ROM, or any other readable medium for storing program instructions.

BRIEF DESCRIPTION OF THE DRAWINGS

A better understanding of the present invention can be obtained when the following detailed description of the preferred embodiment is considered in conjunction with the following drawings, in which:

FIG. 10 is an illustration of an all ones data stream with "stuff bits" and how the "stuff bits" are accounted for;

FIG. 11 is an illustration of mixed ones and zeros data stream with "stuff bits" and how the "stuff bits" are accounted for;

Figure 1:
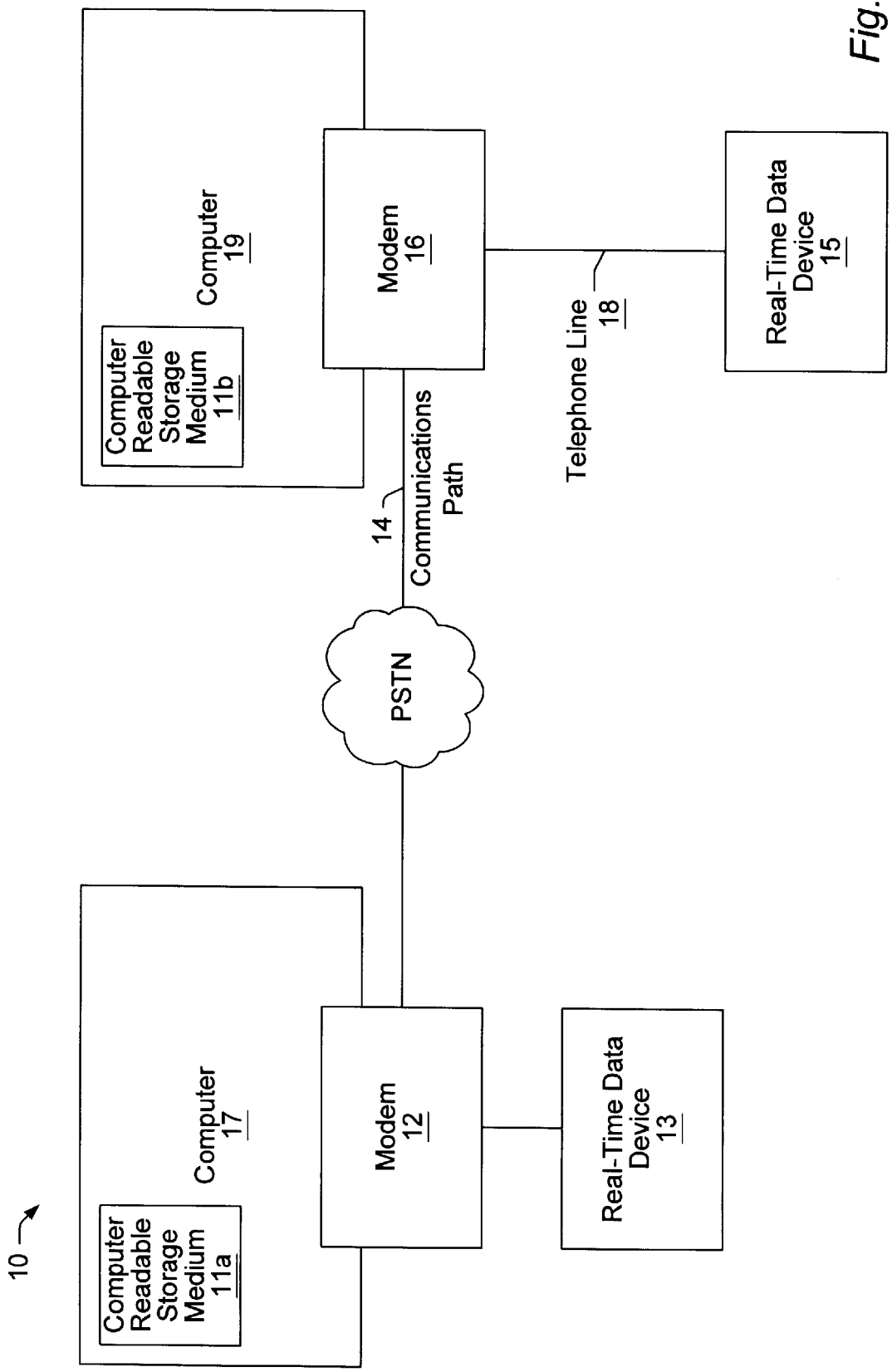
FIG. 1 is a block diagram of a communications system according to an embodiment of the present invention.

While the invention is susceptible to various modifications and alternative forms, specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Referring now to FIG. 1, a block diagram of a telecommunications system 10 comprising modems according to the preferred embodiment of the present invention is shown. The term "modem" used herein is intended to refer to any of various types of communication devices, including analog modems, DSVD modems, ISDN terminal adapters, and ADSL devices, among others.

The system 10 comprises a first modem 12, comprised within a first computer 17, in communication with a second modem 16, comprised within a second computer 19, via a communications path 14. Preferably, the communications path 14 comprises a first telephone line coupled to the first modem 12 and a second telephone line coupled to the second modem 16, wherein the two telephone lines are coupled together via and/or comprise part of the public switched telephone network (PSTN). In another embodiment, portions of the communications path comprise wireless communications means. For example, the first modem 12 may be comprised within a notebook computer and the first modem 12 performs wireless communications with the PSTN via a wireless communications system.

Preferably, the first modem 12 is further coupled to a real-time data device 13, such as a telephone handset, which is used by the first user to speak with a second user. Preferably, the second modem 16 is coupled to another real-time data device 15, such as another telephone handset. Note that the real-time data devices may be any device for transmitting and/or receiving real-time data. Telephones and other real-time audio devices connected to the modem by a PBX or the PSTN by a telephone line are examples of real-time data devices. Alternatively, the real-time data device could be another computer or a subsystem of computers 17 and/or 19. Real-time data from a computer subsystem may include sprite or mouse positioning information.

Preferably, the computer 17 and 19 may be any type of data access device, including a general purpose computer, a personal digital assistant (PDA), a network computer, or television or other viewing device configured as an Internet access device or information access device. The computer 17 is capable of controlling the first modem 12 to perform data transfers with the second computer 19. The modem 12 may be an internal modem or an external modem, i.e., may be comprised within or external to the first computer 17. Likewise, the second modem 16 may be comprised within or external to the second computer 19.

Also, the second computer 19 may function as a data source server for transferring data to or from the first computer 17. For example, if the second computer 19 is comprised as a server within an ISP, the server 19 may be coupled to the Internet and transfer data between the first computer 17 and the Internet. The second computer server 19 may enable the client computer 17 to "surf the net." In another example, the second computer server 19 may be comprised within a remote office coupled to a PBX which enables the first user to enjoy a "virtual presence" within the remote office even though the client resides at a remote location, such as on the road or at home. In this embodiment, the remote client is enabled to access PBX functions and access a local area network (LAN) within the office as if present in the office.

Preferably, each of the modems 12 and 16 are operable to perform simultaneous real-time and non-real time data communications, such as transmitting voice data from real-time data device 13 and regular data (like a file) from first computer 17. The modems 12 and 16 may transmit data to each other upon the communications path 14 as described hereinbelow. Preferably, the data transmitted on the communications path 14 comprises frames of compressed speech data (or other real-time data) multiplexed with other regular digital data, such as Internet data, computer files, video data, digital audio data, or other types of data, where the real-time data and regular data are multiplexed in the same frame. Computers 17 and 19 may include computer readable storage media 11a and 11b which may include computer program instructions operable to implement or assist in implementing simultaneous real-time data and regular data transmissions as described hereinbelow. Modems 12 and 16 may be configured to perform simultaneous real-time data and regular data transmissions as described hereinbelow. The modems may be so configured either through hardware (e.g. circuitry), software (e.g. computer program instructions), or a combination of both.

Figure 2:
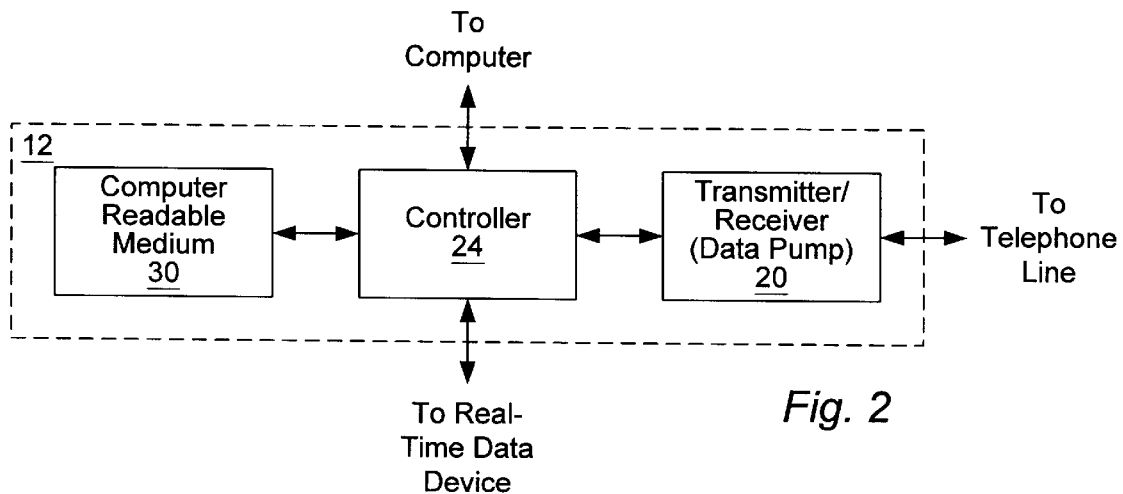
FIG. 2 is a block diagram of a modem of FIG. 1.

Referring now to FIG. 2, a block diagram of one embodiment of the modem 12 or 16 of FIG. 1 is shown. The modem 12 comprises a data pump 20 coupled to the communications path 14. Data pumps are well known in the art of modem design. The data pump 20 may be a Lucent Technologies M-1634. The data pump may perform the functions, among others, of modulating digital data to produce modulated signals for transmission on the communications path 14 to the second modem 16 and demodulating modulated signals received from the second modem 16 to produce digital data. Preferably, the data pump 20 comprises a synchronous serial interface for transferring data frames between a synchronous serial interface comprised in a controller 24.

The controller 24 performs various control functions of the modem 12. As described below, the controller 24 multiplexes/demultiplexes data simultaneously transmitted within a frame, i.e., multiplexed, speech and data within the same frame transmitted to or received from another modem operating as described below. When receiving, the controller 24 may receive from the data pump 20 real-time data such as compressed speech data or voice encoded speech multiplexed in the same frame with regular data. The real-time data may be inserted in the regular data as real-time data capsules. In the example of voice data, the controller separates the voice encoded data capsules from the regular data in each frame and provides the capsules to a vocoder (not shown) coupled to the controller 24. Continuing with the example of voice data, the controller 24 may receive compressed speech data from a vocoder 28, encapsulate the compressed speech data and multiplex them with regular data in a data-frame, and provide the data frame to the data pump 20. In one embodiment, the controller 24 is operably coupled to the computer 17 by an expansion bus, such as an Industry Standard Architecture (ISA) or Peripheral Component Interconnect (PCI) bus, through bus interface circuitry. The controller 24 receives data from and sends data to the computer for exchange with the user.

To further illustrate one possible application of the present invention, the following is presented. A user at the first modem 12, speaks into a handset (13), to converse with a second user, who is connected through real-time device 15 (possibly another handset). A vocoder in the first modem 12 encodes, i.e., compresses, the first user's speech. The modem 12 encapsulates the speech data and multiplexes the compressed speech data with regular data in the same frame and transmits the speech and data frame across the communications path 14 to the second modem 16. Such multiplexed frames are repeatedly transferred until all data has been communicated. The second modem 16 receives the stream of frames and demultiplexes the speech and data frames in each frame.

The compressed speech capsules are then provided to a vocoder in the second modem 16 which decompresses the compressed speech data to produce a speech signal, preferably an analog speech signal. The speech signal is provided on the telephone line 18 to the device 15. Device 15 preferably comprises a speaker for transducing the analog speech signal into sound pressure waves which are audible to the second user. The regular data is provided to the computer 19, which may provide the data to a data source such as a LAN or the Internet or store it for later use by the second user.

Similarly, real-time speech data may received by the vocoder in the second modem and compressed into compressed real-time data capsules. The compressed speech capsules are multiplexed with regular data in a frame and transmitted by the second modem 16 to the first modem 12. The first modem 12 receives the frames and demultiplexes the speech capsules from the regular data. The first modem 12 decompresses the received speech capsules to produce a speech signal. The speech signal may transduced into speech which the client hears on the handset 13 speaker and the regular data may be stored in computer 17 or sent on to a network.

Thus, the hereindescribed communication mechanism allows the simultaneous transfer of real-time data and non-real-time data on a single communication link. As will be seen from the following discussion, this mechanism provides improved latency. Furthermore, in some embodiments, the mechanism may be implemented using conventional modem hardware. Such embodiments may involve the use of a computer program as described below. Furthermore, the communication mechanism described herein does not require special telephone service such as ISDN.

The controller 24 comprises any processor device which is capable of executing a stored program of instructions or embedded controller device. Preferably, the controller 24 comprises a processor, such as a microprocessor core, and peripheral devices, such as the synchronous serial interface. In one embodiment, the controller 24 may be a Zilog Z80182 microcontroller.

The stored program instructions which the controller 24 may execute may be comprised within a computer readable medium 30, such as a read-only memory (ROM), programmable ROM (PROM), erasable PROM (EPROM), FLASH memory, dynamic random access memory (DRAM), static random access memory (SRAM), among others, or a combination thereof. The memory may be used to store programs instructions and data executed by the controller 24 to implement the hereindescribed communication mechanism. The memory 30 may comprises buffers used to buffer data received from real-time data device 13 before being provided to the data pump 20.

Vocoders are well known in the art of voice encoded speech. Preferably, a vocoder that may be used in a voice data/regular data embodiment may comprise an AT&T 1635. The vocoder may encode speech signals received from a telephone (13) and provides the compressed speech data to the controller 24. The vocoder may also receive compressed speech data from the controller 24 and decodes the compressed speech frames back to produce analog voice signals which are provided to the telephone line for reproduction to the user.

It is noted, however, that compressed speech data and the use of vocoders is just one example of a real-time data application that may be used with the present invention. The present invention is not limited to any specific real-time data application. Any real-time data may be multiplexed with regular data according to the present invention.

Figure 3:
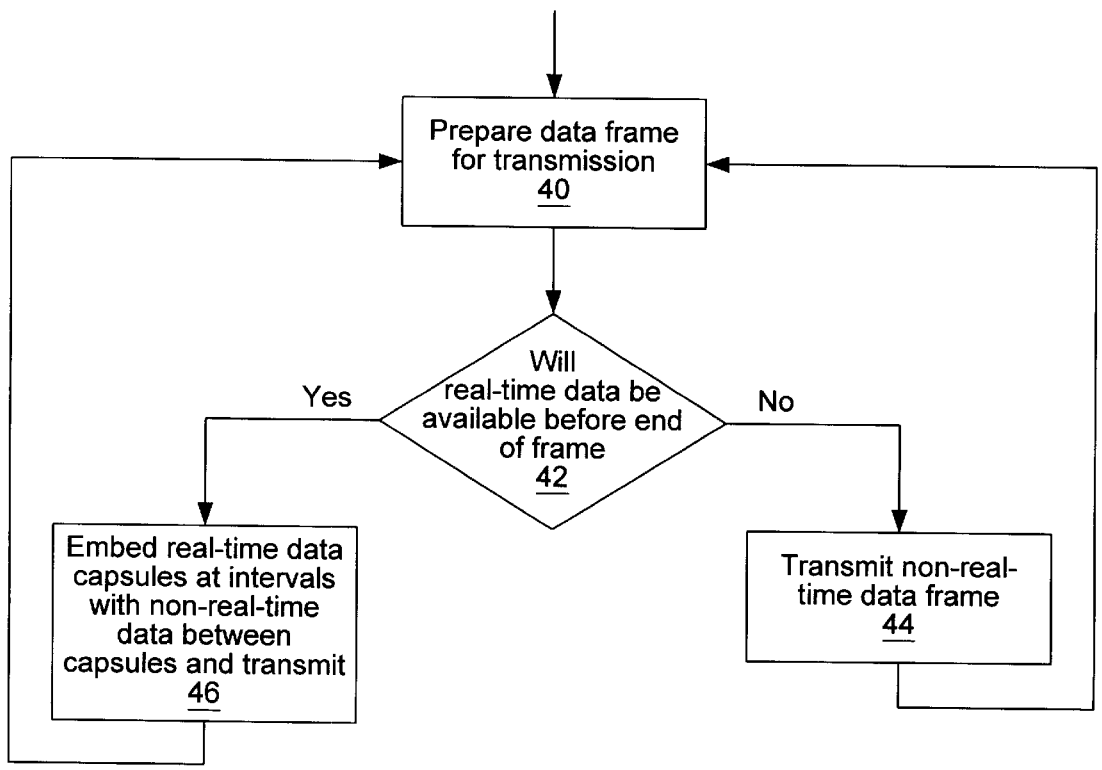
FIG. 3 is a flow diagram illustrating a mechanism for transmission of real-time and regular data multiplexed in the same data frame.

Turning now to FIG. 3, a flow diagram is shown of a communication mechanism for multiplexing real-time data capable of being delivered at regular intervals across a communications link transferring non-real-time data. The mechanism may extend a communication link's existing packet protocol (such as V.42/HDLC) to provide very low latency for the real-time data with a minimal impact on existing data transfer efficiency. A data frame is prepared for transmission, as shown at 40. Before each data frame is transmitted, the transmitter determines the time before the next real-time data will become available for transmission. Real-time data may be supplied by a real-time data device at regular intervals. The transmitter determines if real-time data will be available before the end of the data frame, as shown at 42. If real-time data will not be available during the data frame, the transmitter transmits the data frame with regular, or non-real-time, data as shown at 44. The transmitter may then begin preparation of the next data frame. If real-time data will be available before the end of the frame, the transmitter embeds real-time data within the data frame and transmits the data frame with the embedded real-time data and regular data to a receiver, as shown at 46. The real-time data may be embedded within the data frame by multiplexing capsules of real-time data with regular data where regular data is transmitted between the real-time data capsules. After transmission of a data frame comprising real-time data capsules and regular data between the capsules, the transmitting devices may begin preparation of the next data frame. In a buffered system, preparation of one data frame may occur concurrently with transmission of another data frame. If the real-time data device supplying the real-time data is inactive, then normal regular data frames may be transmitted such as V.42/HDLC data frames. The real-time data may include voice or telephony data or may include mouse or sprite positioning data.

Figure 4:
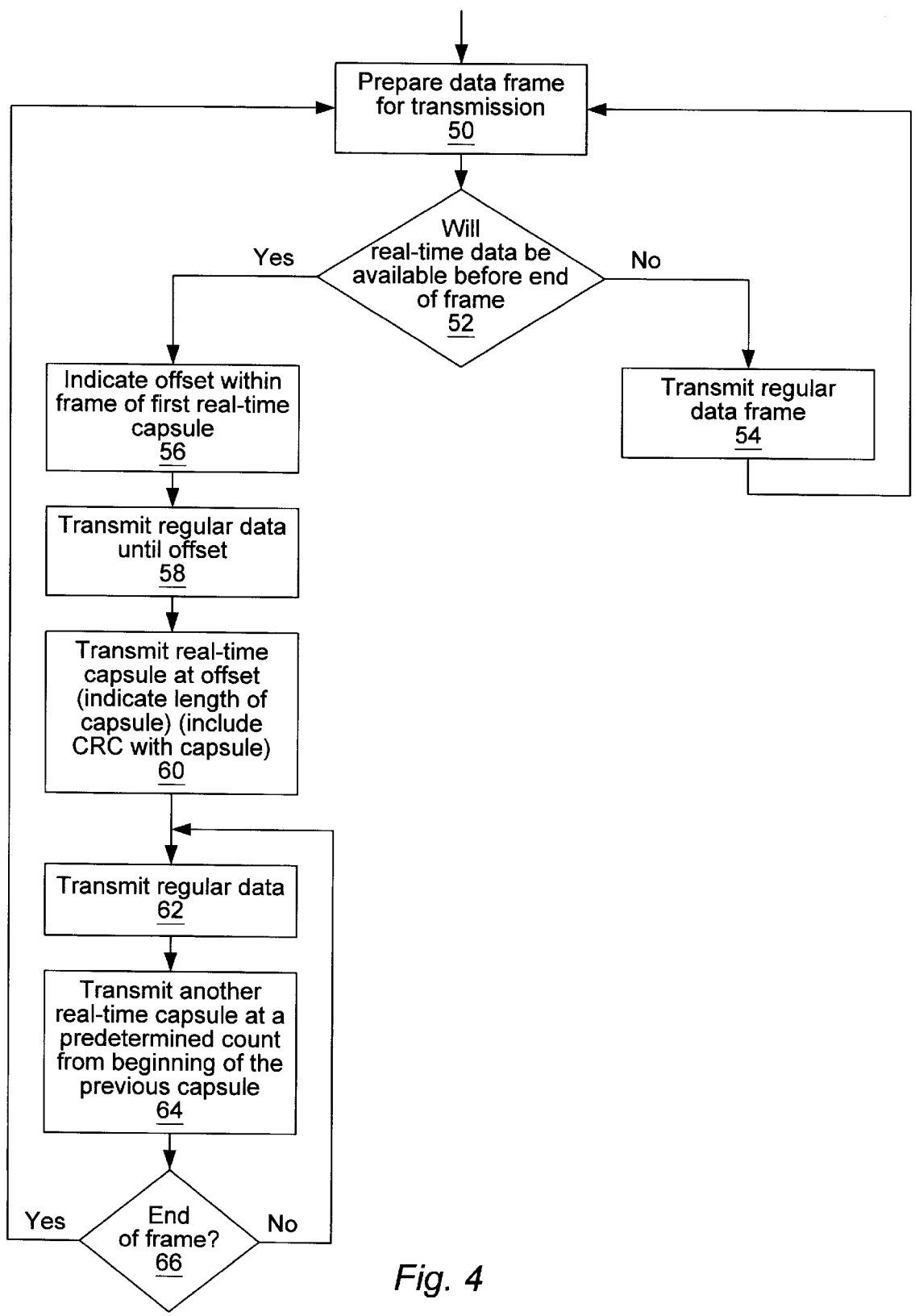
FIG. 4 is a more detailed flow diagram illustrating a mechanism for transmission of real-time and regular data multiplexed in the same data frame.

Turning now to FIG. 4, a more detailed embodiment for transmitting real-time data and regular data according to the present communications mechanisms is illustrated. A data frame is prepared for transmission, as shown at 50. The transmitting device determines if real-time data will be available before the end of the frame, as shown at 52. If real-time data will not be available before the end of the frame, a regular data frame comprising regular, or non-real-time, data is transmitted, as shown at 54. Then a new data frame may be prepared for transmission. If real-time data will become available before the end of the data frame, the transmitting device may indicate an offset within the frame at which a first real-time data capsule will be inserted, as shown at 56. The offset may be indicated by bits in a header of the data frame. Reserved bit values within the header according to an existing protocol such as V.42/HDLC may be used to indicate the offset. Therefore, the present communications mechanism may be used with any existing communications protocol having reserved header bits without adding any additional overhead for indicating the real-time data capsule offset.

As the data frame is transmitted, regular data is transmitted until the offset is reached. Regular data is thus transmitted until this offset is reached at which point a capsule of real-time data is inserted into the data stream, as shown at 60. Each capsule is structured such that its length may be determined by the receiving device. The transmitter may indicate the length of the capsule in an initial field or header of the capsule. Furthermore, an error code may be included with the capsule such as a cyclic redundancy code (CRC). The error code may be included at the end of the real-time data capsule. Depending upon the nature of the real-time data, the error check may be less rigorous than that performed for the regular data. For example, a very occasional burst of noise may be acceptable in an audio application, therefore, the error code or CRC for the real-time data capsule may be a single 8-bit or one octet code. To minimize data overhead when no real-time data need be transferred for a particular capsule, such as during silence, muting, or half duplex audio for an audio application, a length value of zero may be used for the capsule and the error code may be omitted from the capsule.

If the end of the data frame has not been reached, regular data is transmitted after the first real-time data capsule until a predetermined count from the beginning of the first real-time capsule has been reached, as shown at 62. Another real-time data capsule is inserted at the predetermined offset from the beginning of the first real-time data capsule, as shown at 64. This process repeats, as shown at 66, until the end of the frame, with regular data transmitted between real-time capsules where the real-time capsules are spaced by the predetermined count. The predetermined count may correspond to the interval at which the real-time data device provides real-time data to the transmitting device. The predetermined length between the capsules may be measured by counting a predetermined number of octets of data from the beginning of the immediately preceding capsule of real-time data. Thus, a data frame transmitted according to FIG. 4 may include capsules of real-time data spaced by a regular interval from the beginning of each capsule with regular, or non-real-time, data transmitted between each capsule. Note that if real-time data is inactive, such as when a telephone is on hook, the transmitter may leave the reserved header bits of the data frame with their default values to avoid any overhead to the regular data. In that case a regular data frame would be transmitted.

Figure 5:
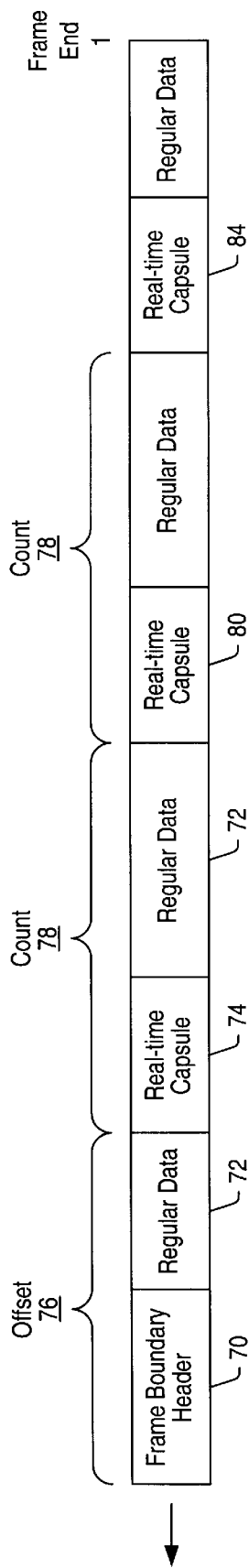
FIG. 5 is an illustration of a data frame with multiplexed real-time and regular data.

Turning now to FIG. 5, an example of a data frame is illustrated. The frame begins with a frame boundary and/or header information 70. A special sequence of bits may be used to indicate the beginning of a frame. The frame boundary header information 70 also indicates offset 76 at which the first real-time capsule 74 is located from the beginning of the frame. Although offset 76 shows a location from the beginning of the frame boundary header, alternatively the offset may be calculated from the end of the frame boundary header 70 portion. All that is necessary is for offset 76 to indicate the location of the first real-time capsule 74 within the data frame. Regular data 72 may be transmitted between the end of the frame boundary header 70 and the first real-time capsule 74. However, if an offset of zero is indicated then no regular data may be transmitted between frame boundary header and the first real-time capsule 74. The next real-time capsule 80 is inserted at a count 78 from the beginning of the first real-time capsule 74. The count 78 may be determined by counting octets of data transferred or by any other means of determining the amount of data being transmitted. Count 78 may correspond to the interval at which real-time data capsules become available. Regular data 72 is transmitted between real-time capsules 74 and 80. As can be seen in FIG. 5, the multiplexing of regular data and real-time capsules within the data frame continues until the end of the frame.

Figure 6:
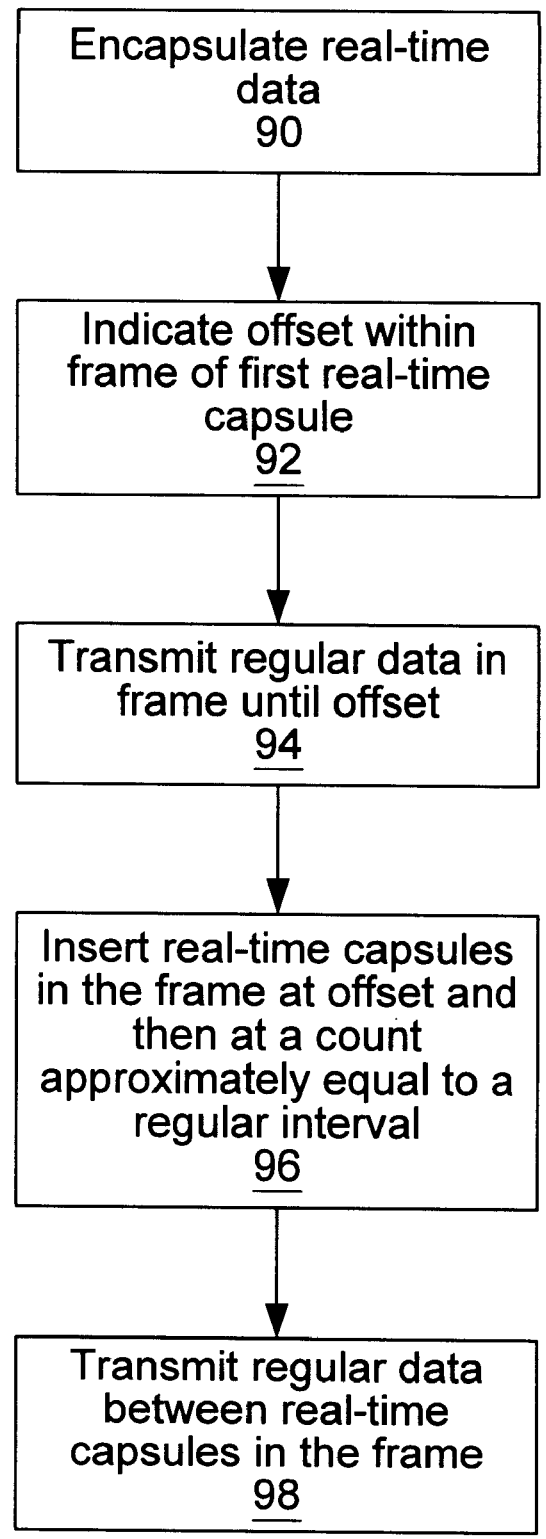
FIG. 6 is a flow diagram illustrating the transmission of encapsulated real-time data inserted in a data frame with regular data between real-time capsules.

The present communication mechanism is further described in the flow diagram of FIG. 6. FIG. 6 illustrates a mechanism for transmitting real-time data and non-real-time data across a communication link in data frames. The real-time data may be available for transmission at regular intervals. Real-time data is encapsulated, as shown at 90. An offset within a data frame is indicated for the first real-time capsule to be inserted, as shown at 92. Regular data is transmitted in the date frame until the offset is reached, as shown at 94. A real-time data capsule is inserted in the frame at the offset and then additional real-time data capsules are inserted in the data frame at a predetermined interval measured by a count form the beginning of the previous real-time data capsule, as shown at 96. The count may be determined according to the data transmission rate by counting units of data to be transmitted. The units of data counted may be octets (8 bits). Regular data is transmitted between the real-time capsules in the data frame, as shown at 98. Counting to determine the point at which real-time data capsules are to be inserted may be accomplished by counting octets of data so that no direct timing connection between the transmitter and the device supplying the real-time data is necessary. For a known data transmission rate, a time interval may be measured by counting octets of data. For example, if real-time data is supplied at 10 ms intervals and the transmission rate is 21.6 kilobits per second, then the count between real-time data capsules equates to 27 octets. While counting octets is the preferred method, any timing method may be used for determining when to insert real-time capsules, such as direct synchronization.

Counting units of data to be transmitted, such as octets, may allow implementation of the present mechanism without requiring any specialized timing. However, several special cases must be taken into account when counting units of data for timing purposes. For example, it is not possible to insert a real-time capsule at all locations within a frame. A capsule may not be inserted, for example, at the header location. Also, if an error check code is included at the end of the frame for the entire frame, a capsule obviously cannot be inserted at that point.

Figure 7:
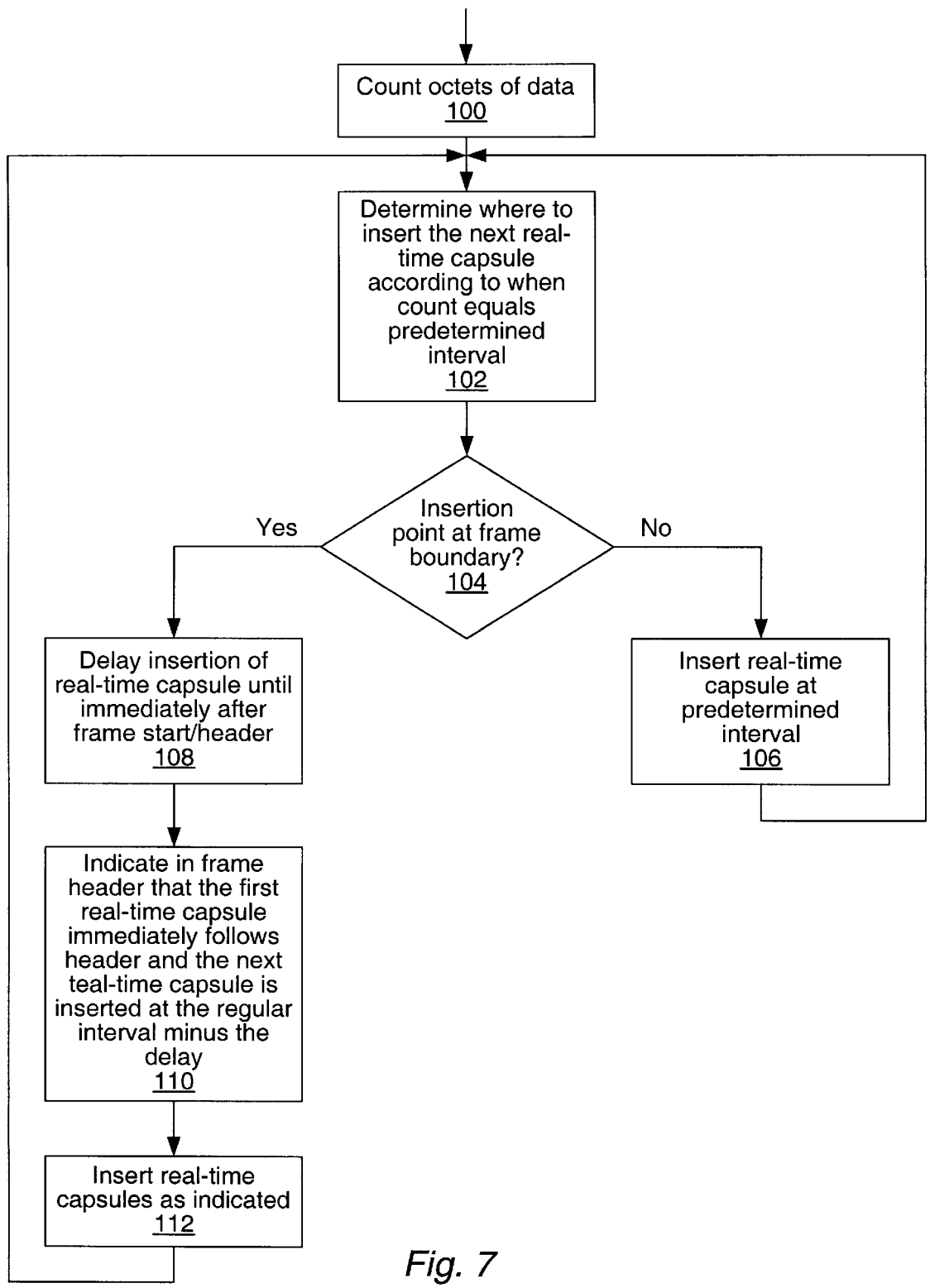
FIG. 7 is a flow diagram illustrating insertion of real-time capsules when the capsule insertion point falls on a frame boundary.

Turning now to FIG. 7 a flow diagram illustrates a method for compensating for the case of when capsules cannot be inserted at certain locations such as frame boundaries. Units of data, or octets, are counted, as shown at 100. The transmitter determines where to insert the next real-time capsule according to when the count equals the predetermined interval, as shown at 102. The transmitter determines if this insertion point falls at a frame boundary such as the beginning of a new frame or the ending CRC code of a current frame, as illustrated at 104. If the insertion point for the current real-time capsule does not fall at a frame boundary, the capsule is inserted at the count corresponding to the predetermined interval, as shown at 106, and the process continues for the next real-time capsule. However, if the insertion point does fall at a frame boundary or at a point where the real-time capsule cannot be immediately inserted, insertion of the capsule is delayed until immediately after the frame beginning and/or header of the new frame, as shown at 108. A small buffer in memory may be used during the delay. The transmitter indicates in the frame header that the first real-time capsule will immediately follow the header and that the next real-time capsule will be inserted at the regular predetermined interval minus the amount that the insertion of the first real-time capsule was delayed, as shown at 110. This indication may be made within the same bits of the header used for the offset as discussed above. Thus, if a real-time capsule falls on the frame boundary, its insertion may be delayed until immediately after the initial frame boundary and then the next real-time capsule will be inserted at the regular interval from the beginning of the first real-time capsule minus the amount by which the first real-time capsule insertion was delayed, as shown at 110 and 112. Thereafter, insertion of real-time capsules may be performed at the regular predetermined count, as discussed above. The flow diagram of FIG. 7 shows how a special value of the initial offset may be used to indicate that the first capsule shall be immediately inserted following the initial frame boundary and the subsequent capsule may be "backed up" to restore alignment. Note that this may cause a small non-cumulative jitter. This jitter may be, for example, up to three octets in HDLC.

Figure 8:
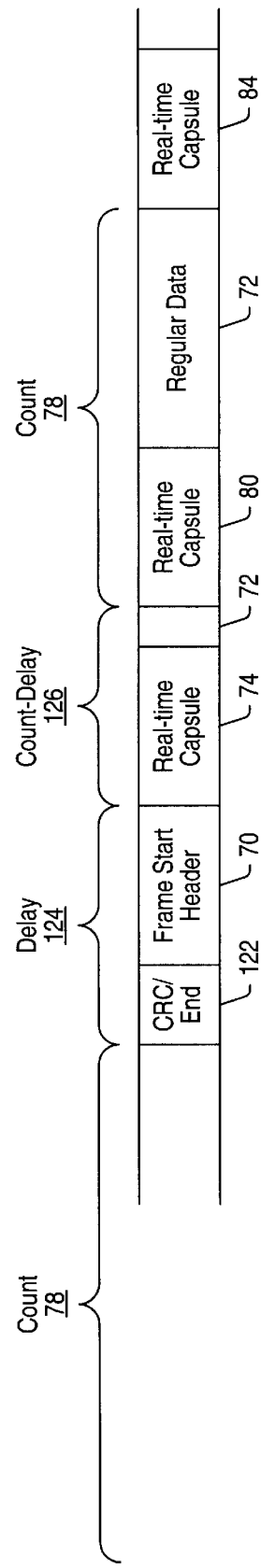
FIG. 8 is an illustration of a data frame compensating for when the capsule insertion point falls on a frame boundary.

Turning now to FIG. 8, an example of a data stream in which insertion of the first real-time capsule is delayed is illustrated. As shown by count 78, the insertion point for the next real-time capsule falls upon the error check code or frame end 122 of a frame. Therefore, the insertion of the capsule is delayed by delay 124 until immediately after the frame start/header 70. A special offset is indicated in header 70 to indicate that the first real-time capsule of the frame is located immediately following the header 70. In this is case, the initial offset may be zero. The header 70 also indicates that the next real-time capsule 80 following the first real-time capsule 74 will be located at an offset from the beginning of the first real-time capsule equal to the regular, predetermined count minus the delay, as indicated by 126. Thereafter, real-time capsules are inserted at the regular count 78, as shown by real-time capsule 84. Also, regular data 72 is transmitted between the real-time capsules.

Another problem that may arise when counting octets of data for timing purposes, such as determining when to insert real-time capsules, is that it may not be possible to count octets during idle times between data frames. Also, clock drift may cause the source of the real-time data capsules to differ from the transmitting device's clock. When a line idles between data frames, regular data may be forced to wait until the next frame in which real-time data will be inserted. Since the line is idle, this has negligible impact on regular data through put. Clock drift may also opportunistically be recovered from, as discussed below. When a line has continuous data it may be necessary to resynchronize capsules. This may be done by noting the value of the octet count when the capsule becomes available. If this value drifts, the first capsule offset in the frame may be adjusted to compensate. The predetermined count interval at which the transmitter normally inserts real-time capsules may be compared to the interval at which real-time data is actually received from the real-time data device. If these intervals differ due to clock drift, the difference may be compensated for by simply adjusting the offset at which the first real-time capsule will be inserted in the data frame.

Figure 9:
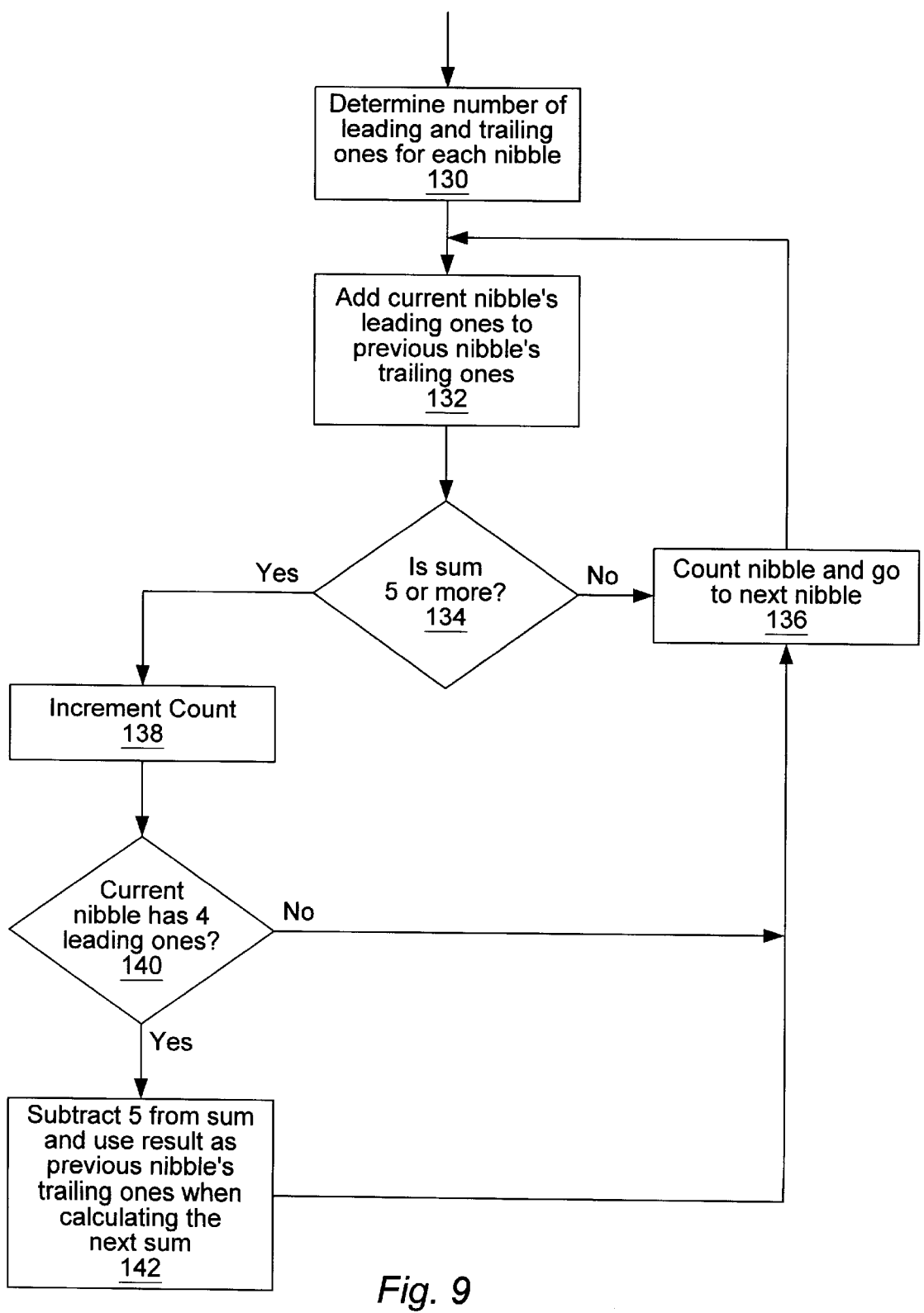
FIG. 9 is flow diagram illustrating accounting for "stuff bits" when counting units of data transmitted.

When a data stream is encoded, according to some protocols such as HDLC, special bits may be stuffed into the data stream to prevent data from being confused with special characters such as flags and abort symbols. For example, in HDLC a zero bit is inserted after five successive one bits. This is because a special flag symbol starts with six one bits. Therefore, in order to distinguish a flag from data, a zero bit is stuffed into the data stream after five successive one bits. When the receiving device decodes the data stream the stuffed bits are removed from the data stream. If a software implementation is used to count octets in the data stream then the stuffed bits must be accounted for. FIG. 9 illustrates a mechanism for accounting for stuffed bits in a communication protocol. While this particular flow diagram illustrates accounting for stuffed bits according to HDLC, it is clear that the mechanism may be modified to account for any other such protocol that inserts extra bits into the data stream. The illustrated mechanism examines nibbles of the data stream. However, for other protocols, other data lengths may be examined For each nibble in the data stream, a number of leading and trailing ones is determined as shown at 130, wherein a nibble is four bits of the data stream. A look-up table created by software may be used for this purpose. The current nibble's leading ones are added to the previous nibble's trailing ones as shown at 132. If the sum is less than five, the nibble is counted as a regular nibble with no stuff bits and the mechanism proceeds to the next nibble, as shown at 134 and 136. If the sum is five or more, the sum is incremented to account for a stuff bit, as shown at 138. It is then determined if the current nibble's number of leading ones is less than four. In other words, whether or not the current nibble is all ones, or F in hex. If the current nibble's leading ones are less than four then the nibble is counted and the process continues, as shown at 140 and 136. However, if the number of leading ones is four then five is subtracted from the sum obtained at 134 and the result is used as the previous nibble's number of trailing ones when calculating the next sum, as shown at 140 and 142. This adjusts for the case of a nibble having "shared" leading and trailing ones and so that the ones were consumed in the previous sequence. The current nibble is counted and the process then proceeds to the next nibble, as shown at 136.

FIG. 10 illustrates how stuffed bits may be accounted for with the mechanism of FIG. 9. FIG. 10 shows counting of a data stream including nine nibbles wherein each nibble of data is all ones or hex F's, as shown at 150. The data actually transmitted has zeros stuffed after every five consecutive ones so that special data sequences may be distinguished, as illustrated at 152. The data stream before the zeros are stuffed, or after they are removed, is illustrated at 154. The number of leading and trailing ones for each nibble is illustrated at 156. The sum of the current nibble's leading ones and the previous nibble's trailing ones is illustrated at 158 as the first number shown. This sum may correspond to the sum calculated in 132 of FIG. 9. The second sum shown for each nibble at 158 corresponds to the sum after the subtraction of the ones consumed by the previous data sequence if the current nibble has "shared" leading and trailing ones and corresponds to 142 in FIG. 9. The number of bits counted for each nibble is shown at 160 and the total count is shown at 162.

Examining the first nibble shows it has four leading ones and four trailing ones as shown in the first column at 156. The sum shown for the first nibble at 158 is four since there is no previous nibble having trailing ones to add to the leading ones of the first nibble. Therefore, the bits counted and the total count for the first nibble are four. Since the data stream shown is all ones, each nibble has four leading and four trailing ones, as shown at 156. In other words, the same four ones may be seen as both leading and trailing ones for each nibble. Since the sum for the second nibble is eight at 134 of FIG. 9, the "yes" path would be taken to 138. Also, since the second nibble has four leading ones, the "yes" path would be taken from 140 to 142 at which point the ones in the previous nibble consumed by a previous sequence (five ones), i.e. a sequence before a stuffed bit, are subtracted. The result is shown as the second number at 158. This result will be used as the previous nibble's trailing ones when calculating the sum for the next nibble. So for the second nibble, the nibble plus one is counted, as shown in column 2 at 160, giving a total count of nine, as shown at column 2 at 162. For the third nibble, three is used for the previous nibble's number of trailing ones, giving a sum of seven, as shown by the first number at column 3 at 158. Since the third nibble has four leading ones, two will be used as its trailing ones when calculating the sum for the fourth nibble as shown by the second number at column 3, 158. Again the nibble is counted plus one giving a total count at the third nibble of 14, as shown at column 3, 162. The counting proceeds for nibbles 4–9 as illustrated. Note that for nibble 6, all four ones of the previous nibble are consumed in the previous stuffed sequence. Therefore, zero was used as the previous nibble's number of trailing ones giving the sum of four, as shown at column 6, 158. Therefore, only the four bits of nibble 6 are counted, as shown at column 6, 160 and no subtraction from the sum is performed.

FIG. 11 illustrates another example of counting according to the mechanism of FIG. 9 wherein the data comprises a mix of ones and zeros, as shown at 170 and 174. The actual data transmitted with stuffed bits is shown at 172. The leading and trailing ones for each nibble are shown at 176. For example, it can be seen that nibble 1 has one leading one and two trailing ones, as shown at column 1, 176. The sum of each nibble's leading ones and the previous nibbles trailing ones is shown at 178, and the bits counted for each nibble are shown at 180, with the total count shown at 182. For example, the sum for nibble 1 is one since there is no previous nibble, and nibble 1 has only one leading bit. Therefore, four bits are counted for this nibble. For the second nibble the sum is five since the second nibble has three leading bits and the first nibble has two trailing bits. Since the sum for nibble 2 is five, the "yes" path would be taken at 134, and since nibble two has less than four leading ones, the "no" path would be taken at 140, and the nibble plus one would be counted, as shown at column 2, 180. The counting continues as shown for nibbles 3–9.

Figure 12:
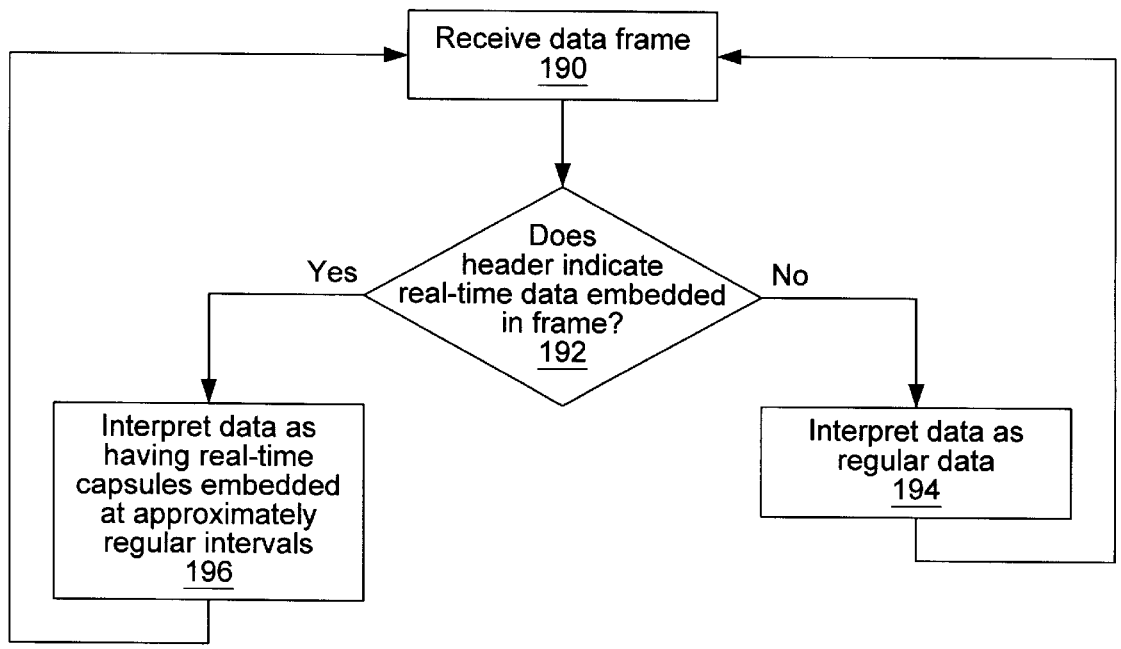
FIG. 12 is a flow diagram illustrating receiving a data frame with real-time and non-real-time data multiplexed in the data frame.

A communication mechanism has been described so far in terms of the transmitting device. FIG. 12 illustrates the mechanism from the prospective of the receiver. Broadly speaking, a data frame is received as shown at 190. The receiver checks if the header indicates if real-time data is embedded within the frame, as shown at 192. If no real-time data is embedded, the data frame is interpreted as a regular data frame, as shown at 194, and the receiver continues on to the next data frame. If real-time data is embedded in the frame, then the receiver interprets the frame as having real-time capsules embedded at approximately regular intervals where the interval spacing is predetermined, as shown at 196. Therefore, the receiver is able separate the real-time data capsules from the regular data. Thus, the receiver knows when to expect each capsule in the data frame by counting a predetermined number of data units, such as octets, from the previous capsule. Furthermore, it is clear how the mechanisms illustrated in FIGS. 4–11 may be applied to the receiver. For example, the receiver may read the offset in the header to determine the location of the first real-time capsule. Also, the receiver may read a special offset indicating that the first real-time capsule has been delayed and thus immediately follows the header, and that the next real-time capsule has been inserted at the predetermined count minus the amount of the delay. Also, the receiver may account for stuffed bits as illustrated in FIGS. 9–11.

Figure 13:
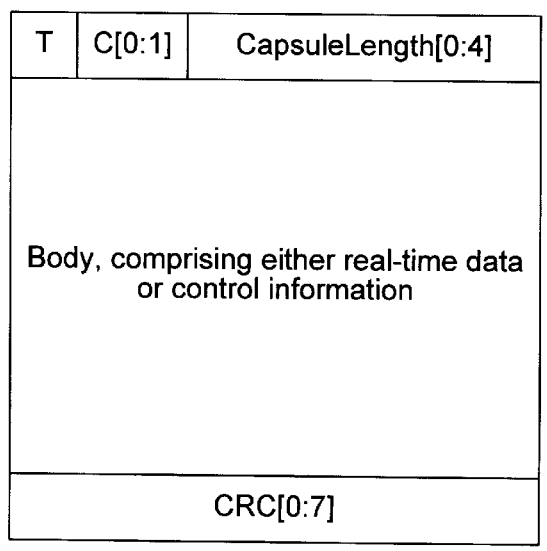
FIG. 13 is an illustration of a possible capsule format.

FIG. 13 illustrates a format for the real-time capsules. The format shown in FIG. 13 is merely an example of one embodiment. Any format may be utilized in accordance with the disclosed communication mechanism. The exact formatting of bits is not critical to the mechanism. The example of FIG. 13 shows a first octet comprising a type bit T for indicating whether or not the capsule comprises real-time data or control information. A control sequence number (for acknowledging control frames) may also be indicated by bits C[0:1]. The capsule length may be indicated by bits CapsuleLength[0:4], as shown. The length may be large enough for G.723.1, G.726, G.727 and G.729(A). Following this initial octet may be the body of the capsule comprising either real-time data or control information as indicated by the initial octet. If the capsule is a control capsule, the control information may include control information according to the control sequence number similar to V.42 NR/NS and may include control data such as capsule separation negotiation, error signaling (signaling bad CRC to allow transmitter to abort the frame and recover quickly thus preventing prolonged loss of real-time data), or telephony signaling (DTMF, Call Progress, Hook Control, Current/Ring Sense, etc.). The capsule may conclude with an error code such as a cyclic redundancy code (CRC) indicated by bits CRC[0:7]. If the initial length field is zero, the control sequence may be ignored by the receiver, and no CRC may be sent. This may be useful for minimizing overhead imposed on regular data when the real-time data is idle, such as for audio silence.

Therefore, the hereindescribed communication mechanisms provides a system and method for low latency multiplexing of real-time and regular data in a data frame. The mechanisms may be applied to applications such as transmitting telephony audio and control information between modems The mechanisms described may be applied as an extension to standards such as the V.42 standard.

Although the system and method hereindescribed have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for transmitting real-time data across a communication link transferring non-real-time data, comprising:
   preparing a non-real-time data frame for transmission;
   if real-time data will be available for transmission before the non-real-time data frame transmission will have been completed, embedding real-time data within the non-real-time data frame and transmitting the non-real-time data frame with embedded real-time data to a receiver; and
   if real-time data will not be available for transmission before the non-real-time data frame transmission will have been completed, transmitting the non-real-time data frame without embedded real-time data to the receiver.

2. The method as recited in claim 1, further comprising determining if the real-time data will be available for transmission before the non-real-time data frame transmission will have been completed.

3. The method as recited in claim 1, wherein real-time data becomes available at approximately regular intervals.

4. The method as recited in claim 1, wherein the real-time data includes voice or telephony data.

5. The method as recited in claim 1, wherein the real-time data includes mouse or sprite positioning data.

6. The method as recited in claim 1, wherein said embedding real-time data within the non-real-time data frame and transmitting the non-real-time data frame with embedded real-time data to a receiver comprises:
   indicating, within a header of the non-real-time data frame, an offset within the non-real-time data frame of the start of the real-time data;
   transmitting at least a portion of the non-real-time data after the header until the offset is reached; and
   transmitting a capsule of the real-time data at the offset within the non-real-time data frame.

7. The method as recited in claim 6, wherein said transmitting a capsule of the real-time data comprises indicating the length of the real-time data capsule being transmitted.

8. The method as recited in claim 7, wherein the length of the real-time data capsule being transmitted is indicated in a header of the real-time data capsule being transmitted.

9. The method as recited in claim 8, wherein the length of the real-time data capsule indicated in a header of the real-time data capsule is set to zero if no real-time data need be transmitted for that capsule.

10. The method as recited in claim 9, wherein the length of the real-time data capsule indicated in a header of the real-time data capsule is set to zero during audio silence, muting, or half duplex audio.

11. The method as recited in claim 6, wherein said transmitting a capsule of the real-time data comprises including an error check code within the capsule of the real-time data.

12. The method as recited in claim 11, wherein the error check code comprises cyclic redundancy check (CRC) bits inserted at the end of the capsule of the real-time data.

13. The method as recited in claim 6, wherein said embedding real-time data within the non-real-time data frame and transmitting the non-real-time data frame with embedded real-time data to a receiver further comprises:
   transmitting another capsule of the real-time data after a predetermined length from the beginning of the immediately preceding capsule of the real-time data; and
   transmitting another portion of the non-real-time data between capsules of the real-time data.

14. The method as recited in claim 13, wherein said predetermined length corresponds to a regular interval at which the real-time data becomes available.

15. The method as recited in claim 13, further comprising repeating, until the end of the frame, said transmitting another capsule of the real-time data after a predetermined length and said transmitting another portion of the non-real-time data between capsules of the real-time data.

16. The method as recited in claim 13, wherein said transmitting another capsule of the real-time data after a predetermined length comprises counting a predetermined number of octets from the beginning of the immediately preceding capsule of the real-time data.

17. A method for transmitting real-time data and non-real-time data across a communication link in data frames, wherein real-time data is available at a regular interval, the method comprising:
   encapsulating real-time data into a plurality of real-time capsules;
   inserting the real-time capsules into a data frame at a count approximately equal to said regular interval;
   transmitting non-real-time data between the real-time capsules in the data frame; and
   wherein said count is determined according to a data transmission rate by counting units of data to be transmitted, each said units of data equaling a count unit.

18. The method as recited in claim 17, wherein said data frame comprises boundary portions including a header portion, the method further comprising:
   indicating within said header portion an offset within the data frame of a first real-time capsule to be transmitted in the data frame;
   inserting the first real-time capsule at said offset; and
   inserting real-time capsules after the first real-time capsule at said count from the beginning of the immediately preceding real-time capsule.

19. The method as recited in claim 18, further comprising:
   if said count indicates that an insertion point a real-time capsule falls at one of the frame boundary portions:
      delaying insertion of that real-time capsule as the first real-time capsule until immediately after the header portion; and
      inserting the next real-time capsule following the first real-time capsule at said count from the beginning of the first real-time capsule minus the amount by which the first real-time capsule was delayed.

20. The method as recited in claim 19, further comprising, if said count indicates that an insertion point for one of the real-time capsules falls at one of the frame boundary portions, indicating in the header portion that the next real-time capsule following the first real-time capsule will be inserted at said count from the beginning of the first real-time capsule minus the amount by which the first real-time capsule was delayed.

21. The method as recited in claim 18, further comprising synchronizing said count to said regular interval by adjusting said offset.

22. The method as recited in claim 17, wherein stuff bits are inserted into the transmission across the communication link to distinguish special data sequences from regular data sequences, wherein said counting units of data being transmitted comprises adjusting for stuff bits by incrementing a number of bits counted when a number of stuff bits corresponding to said count unit has been detected.

23. The method as recited in claim 22, wherein said count unit is an octet, and wherein said adjusting comprises:
- determining the number of leading and trailing ones for each nibble of data;
- obtaining a sum by adding a current nibble's number of leading ones to the previous nibble's number of trailing ones;
- if the sum is five or more, incrementing the number of bits counted;
- if the sum is five or more and the current nibble's number of leading ones is four, subtracting five from the sum and using the result as the previous nibble's number of trailing ones during said obtaining a sum for a next nibble; and
- counting the current nibble.

24. A method for receiving real-time data and non-real-time data, wherein said real-time data and non-real-time data are transmitted across a communication link in data frames, the method for receiving comprising:
- receiving a data frame comprising a header and a data stream;
- determining if the header indicates that real-time data is embedded within the data stream; and
- if said determining indicates that real-time data is embedded in the data stream, interpreting the data stream as having real-time data capsules spaced by a predetermined count and non-real-time data between the real-time data capsules until the end of the data frame.

25. The method as recited in claim 24, wherein the header indicates an offset in the data frame at which a first real-time data capsule is located.

26. The method as recited in claim 24, wherein each real-time data capsule includes a length indication.

27. The method as recited in claim 24, wherein each real-time data capsule includes an error code.

28. The method as recited in claim 27, wherein said error code is a cyclic redundancy check (CRC) code.

29. The method as recited in claim 24, wherein said interpreting comprises counting units of transmitted data to determine when said predetermined count is reached.

30. The method as recited in claim 29, wherein stuff bits are inserted into the data transmission across the communication link to distinguish special data sequences from regular data sequences, wherein said counting comprises incrementing a count when a number of stuff bits corresponding to a unit of transmitted data has been detected.

31. The method as recited in claim 30, wherein said units of transmitted data comprise octets, and wherein said incrementing comprises:
- determining the number of leading and trailing ones for each nibble of data;
- obtaining a sum by adding a current nibble's number of leading ones to the previous nibble's number of trailing ones;
- if the sum is five or more, incrementing the number of bits counted;
- if the sum is five or more and the current nibble's number of leading ones is four, subtracting five from the sum and using the result as the previous nibble's number of trailing ones during said obtaining a sum for a next nibble; and
- counting the current nibble.

32. The method as recited in claim 24, wherein the header indicates a special offset in the data frame at which a second real-time data capsule following a first real-time data capsule is located, wherein said special offset indicates that the second real-time data capsule is offset from the first real-time capsule less than said predetermined count.

33. The method as recited in claim 24, further comprising if said determining indicates that the real-time data is not embedded in the data stream, interpreting the data stream as having the non-real-time data.

34. A modem, comprising:
- a transmitter configured to transmit data across a communication link in data frames; and
- a controller configured to provide real-time data and non-real-time data in the same data frame to said transmitter, wherein said controller is further configured to:
  - encapsulate real-time data into a plurality of real-time capsules at regular intervals;
  - insert the real-time capsules into data frames at a count approximately equal to said regular interval;
  - insert non-real-time data between the real-time capsules in the data frames; and
  - wherein said count is determined according to a data transmission rate by counting units of data to be transmitted, each said units of data equaling a count unit.

35. The modem as recited in claim 34, wherein said data frames comprise boundary portions including a header portion, and wherein said controller is further configured to:
- indicate within said header portion an offset within the data frame of a first real-time capsule to be transmitted in the data frame;
- insert the first real-time capsule at said offset; and
- insert real-time capsules after the first real-time capsule at said count from the beginning of the immediately preceding real-time capsule.

36. The modem as recited in claim 35, said controller further configured to:
- if said count indicates that an insertion point a real-time capsule falls at one of the frame boundary portions:
  - delay insertion of that real-time capsule as the first real-time capsule until immediately after the header portion; and
  - insert the next real-time capsule following the first real-time capsule at said count from the beginning of the first real-time capsule minus the amount by which the first real-time capsule was delayed.

37. The modem as recited in claim 36, said controller further configured to, if said count indicates that an insertion point for one of the real-time capsules falls at one of the frame boundary portions, indicate in the header portion that the next real-time capsule following the first real-time capsule will be inserted at said count from the beginning of the first real-time capsule minus the amount by which the first real-time capsule was delayed.

38. The modem as recited in claim 35, said controller further configured to synchronize said count to said regular interval by adjusting said offset.

39. The modem as recited in claim 34, wherein stuff bits are inserted into the transmission across the communication link to distinguish special data sequences from regular data sequences, said controller further configured to adjust for stuff bits by incrementing a number of bits counted when a number of stuff bits corresponding to said count unit has been detected.

40. The modem as recited in claim 39, wherein said count unit is an octet, and wherein to adjust said count said controller is further configured to:
- determine the number of leading and trailing ones for each nibble of data;
- obtain a sum by adding a current nibble's number of leading ones to the previous nibble's number of trailing ones;
- if the sum is five or more, incrementing the number of bits counted;
- if the sum is five or more and the current nibble's number of leading ones is four, subtracting five from the sum and using the result as the previous nibble's number of trailing ones during said obtaining a sum for a next nibble; and
- counting the current nibble.

41. A modem, comprising:
- a receiver configured to receive data across a communication link in data frames; and
- a controller configured to interpret real-time data and non-real-time data in a same one of said data frames, wherein said controller is further configured to:
  - receive said data frames, wherein said data frames each comprise a header and a data stream;
  - determine if the header indicates that the real-time data is embedded within the data stream of said same one of said data frames; and
  - if the real-time data is embedded in the data stream, interpret the data stream as having real-time data capsules spaced by a predetermined count and non-real-time data between the real-time data capsules until the end of said same one of said data frames data frame.

42. The modem as recited in claim 41, wherein the header indicates an offset in the data frame at which a first real-time data capsule is located.

43. The modem as recited in claim 41, wherein each real-time data capsule includes a length indication.

44. The modem as recited in claim 41, wherein each real-time data capsule includes an error code.

45. The modem as recited in claim 44, wherein said error code is a cyclic redundancy check (CRC) code.

46. The modem as recited in claim 41, wherein said controller is further configured to count units of transmitted data to determine when said predetermined count is reached.

47. The modem as recited in claim 46, wherein stuff bits are inserted into the data transmission across the communication link to distinguish special data sequences from regular data sequences, and wherein said controller is further configured to a count when a number of stuff bits corresponding to a unit of transmitted data has been detected.

48. The modem as recited in claim 47, wherein said units of transmitted data comprise octets, and wherein said controller is further configured to:
- determine the number of leading and trailing ones for each nibble of data;
- obtain a sum by adding a current nibble's number of leading ones to the previous nibble's number of trailing ones;
- if the sum is five or more, incrementing the number of bits counted;
- if the sum is five or more and the current nibble's number of leading ones is four, subtracting five from the sum and using the result as the previous nibble's number of trailing ones during said obtaining a sum for a next nibble; and
- counting the current nibble.

49. The modem as recited in claim 41, wherein the header indicates a special offset in the data frame at which a second real-time data capsule following a first real-time data capsule is located, wherein said special offset indicates that the second real-time data capsule is offset from the first real-time capsule less than said predetermined count.

50. The modem as recited in claim 41, wherein said controller is further configured to, if the real-time data is not embedded in the data stream, interpret the data stream as having the non-real-time data.

51. A computer readable storage medium comprising program instructions, wherein said program instructions are operable to implement steps for transmitting data across a communication link, the steps comprising:
- encapsulating real-time data into a plurality of real-time capsules;
- inserting the real-time capsules into a data frame at a count approximately equal to a regular interval;
- transmitting non-real-time data between the real-time capsules in the data frame; and
- wherein said count is determined according to a data transmission rate by counting units of data to be transmitted, each said units of data equaling a count unit.

52. The medium as recited in claim 51, wherein said data frame comprises boundary portions including a header portion, the steps further comprising:
- indicating within said header portion an offset within the data frame of a first real-time capsule to be transmitted in the data frame;
- inserting the first real-time capsule at said offset; and
- inserting real-time capsules after the first real-time capsule at said count from the beginning of the immediately preceding real-time capsule.

53. The medium as recited in claim 52, the steps further comprising:
- if said count indicates that an insertion point a real-time capsule falls at one of the frame boundary portions:
  - delaying insertion of that real-time capsule as the first real-time capsule until immediately after the header portion; and
  - inserting the next real-time capsule following the first real-time capsule at said count from the beginning of the first real-time capsule minus the amount by which the first real-time capsule was delayed.

54. The medium as recited in claim 53, the steps further comprising, if said count indicates that an insertion point for one of the real-time capsules falls at one of the frame boundary portions, indicating in the header portion that the next real-time capsule following the first real-time capsule will be inserted at said count from the beginning of the first real-time capsule minus the amount by which the first real-time capsule was delayed.

55. The medium as recited in claim 52, the steps further comprising synchronizing said count to said regular interval by adjusting said offset.

56. The medium as recited in claim 51, wherein stuff bits are inserted into the transmission across the communication link to distinguish special data sequences from regular data sequences, wherein said counting units of data being transmitted comprises adjusting for stuff bits by incrementing a number of bits counted when a number of stuff bits corresponding to said count unit has been detected.

57. The medium as recited in claim 56, wherein said count unit is an octet, and wherein said adjusting comprises:

determining the number of leading and trailing ones for each nibble of data;

obtaining a sum by adding a current nibble's number of leading ones to the previous nibble's number of trailing ones;

if the sum is five or more, incrementing the number of bits counted;

if the sum is five or more and the current nibble's number of leading ones is four, subtracting five from the sum and using the result as the previous nibble's number of trailing ones during said obtaining a sum for a next nibble; and counting the current nibble.

58. A computer readable storage medium comprising program instructions, wherein said program instructions are operable to implement steps for receiving data across a communication link, the steps comprising:

receiving a data frame comprising a header and a data stream;

determining if the header indicates that real-time data is embedded within the data stream; and if said determining indicates that real-time data is embedded in the data stream, interpreting the data stream as having real-time data capsules spaced by a predetermined count and non-real-time data between the real-time data capsules until the end of the data frame.

59. The medium as recited in claim 58, wherein the header indicates an offset in the data frame at which a first real-time data capsule is located.

60. The medium as recited in claim 58, wherein each real-time data capsule includes a length indication.

61. The medium as recited in claim 58, wherein each real-time data capsule includes an error code.

62. The medium as recited in claim 61, wherein said error code is a cyclic redundancy check (CRC) code.

63. The medium as recited in claim 58, wherein said interpreting comprises counting units of transmitted data to determine when said predetermined count is reached.

64. The medium as recited in claim 63, wherein stuff bits are inserted into the data transmission across the communication link to distinguish special data sequences from regular data sequences, wherein said counting comprises incrementing a count when a number of stuff bits corresponding to a unit of transmitted data has been detected.

65. The medium as recited in claim 64, wherein said units of transmitted data comprise octets, and wherein said incrementing comprises:

determining the number of leading and trailing ones for each nibble of data;

obtaining a sum by adding a current nibble's number of leading ones to the previous nibble's number of trailing ones;

if the sum is five or more, incrementing the number of bits counted;

if the sum is five or more and the current nibble's number of leading ones is four, subtracting five from the sum and using the result as the previous nibble's number of trailing ones during said obtaining a sum for a next nibble; and counting the current nibble.

66. The medium as recited in claim 58, wherein the header indicates a special offset in the data frame at which a second real-time data capsule following a first real-time data capsule is located, wherein said special offset indicates that the second real-time data capsule is offset from the first real-time capsule less than said predetermined count.

67. The medium as recited in claim 58, the steps further comprising if said determining indicates that the real-time data is not embedded in the data stream, interpreting the data stream as having the non-real-time data.

* * * * *